Figure 1:
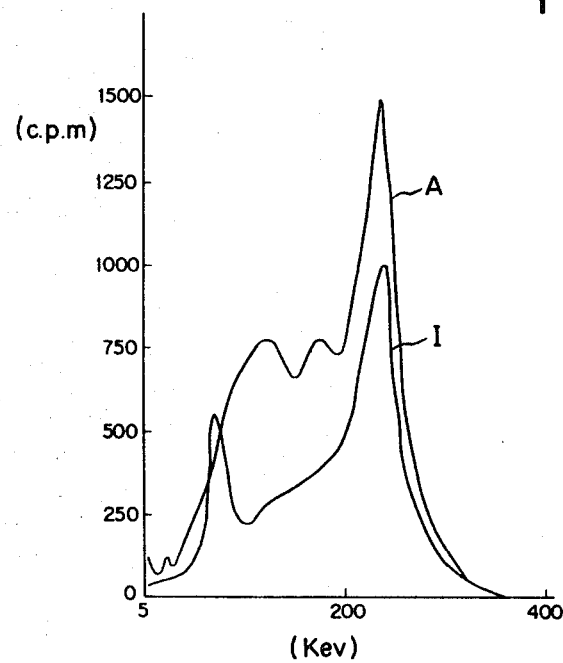

United States Patent
Kato et al.

[15] 3,644,736
[45] Feb. 22, 1972

[54] BACK-SCATTERING ABSORBER MATERIALS FOR GAMMA-RAYS

[72] Inventors: Masao Kato; Goro Tanaka; Seigoro Yamamoto, all of Tokyo, Japan

[73] Assignee: Giken Kogyo Kabushiki Kaisha, Tokyo, Japan

[22] Filed: Nov. 5, 1968

[21] Appl. No.: 773,419

[52] U.S. Cl. .........................................250/108 R, 252/478
[51] Int. Cl. .................................................G21f 1/08
[58] Field of Search................250/108 WS, 108 FS; 252/478

[56] References Cited

UNITED STATES PATENTS 3,143,512   8/1964   Kline..................................250/108 X
3,173,884   3/1965   Jackson..............................250/108 X
3,328,338   6/1967   Parish................................252/478 X

FOREIGN PATENTS OR APPLICATIONS 811,782   4/1959   Great Britain........................252/478

Primary Examiner—Archie R. Borchelt
Attorney—Wenderoth, Lind & Ponack

[57] ABSTRACT

Back-scattering absorber materials for γ-rays comprising a mixture consisting of 70 to 90 percent by weight of lead compound, 10 to 20 percent by weight of barium compound and 3 to 10 percent by weight of iron compound, and a vehicle. In one type of embodiment, polyvinyl alcohol in 25 percent aqueous solution of 28 to 39 percent by weight of said mixture is used as the vehicle. In another type of embodiment, the vehicle is a mixture comprising 30 parts of vinyl acetate as a film-forming agent, 0.2 part of methyl cellulose dissolved in 10 parts of water as a thickening agent, and 4 parts of ammonium salt of vinyl acetate copolymers in 25 percent solution as a dispersing and wetting agent, and said vehicle mixture being 25 to 67 percent by weight of the first principal mixture. Regardless of the type of vehicle, the back-scattering absorption characteristics of the absorber materials are substantially invariant, so far as the composition of the first said principal mixture is kept constant.

5 Claims, 6 Drawing Figures

MASAO KATO
GORO TANAKA   INVENTORS
SEIGORO YAMAMOTO

BACK-SCATTERING ABSORBER MATERIALS FOR GAMMA-RAYS

The present invention relates to back-scattering absorber materials for γ-rays.

One of the principal objects of the present invention is to provide γ-ray absorber materials for minimizing the backscattered rays in the direction opposite to the irradiating direction, among the scattered rays caused by irradiation with γ-rays.

Another principal object of the present invention is to provide back-scattering absorber materials for γ-rays which may be utilized as a shielding wall material for a space in which γ-rays are manipulated, to protect the operators within said shielding wall from radiation harm.

As γ-rays have come to be employed in various uses such as search for defects in materials and the like, the possibility of harm to the bodies of human workers and operators in respect to health and heredity due to the irradiation of the γ-rays upon the human bodies, has increased so that various provisions have been made to dispose shielding walls among the γ-ray source in order to prevent such harm. However, the γ-rays are scattered by such shielding walls, and there is a risk that the amount of γ-rays within the space surrounded by the shielding walls may be enhanced due to the backscattered rays among them.

The present invention overcomes the above-mentioned difficulty, and it relates to back-scattering absorber materials for γ-rays characterized in that said materials comprise a principal mixture consisting of 70 to 90 percent by weight of lead compound, 10 to 20 percent by weight of barium compound and 3 to 10 percent by weight of iron compound.

According to the photoelectric effect, when γ-rays impinge upon a substance atom, the electron or electrons on the orbit having a principal quantum number of L (K-shell) are ejected out, and the equivalent amount of energy is absorbed (K-edge absorption). Then onto the vacant orbit having a principal quantum number of 1, there fall the electrons having the principal quantum numbers 2, 3 and 4 and the azimuthal quantum numbers 2P, 3P and 4P, resulting in emission of energies of $\alpha_1$, $\alpha_2$, $\beta_1$ and $\beta_2$. The intensities of these emitted energies $\alpha_1$, $\alpha_2$, $\beta_1$ and $\beta_2$ depend upon the ratio of statistic weights given by the inner quantum number. Also, depending upon the magnitude of energy of the incident γ-rays, the γ-rays are absorbed by any one of the K, L and M shells of the substance atom.

For instance, in the case of lead, the γ-rays having an energy greater than 87.95 kev. are subjected to K-edge absorption, resulting in emission of characteristic X-rays having an energy of 74.95 kev. (statistic weight maximum).

Also, barium absorbs the γ-rays having an energy greater than 37.43 kev., resulting in emission of characteristic X-rays of 32.19 kev.

Still further, in the case of iron, the γ-rays having an energy greater than 7.11 kev. are absorbed, resulting in emission of characteristic X-rays of 6.40 kev.

Besides the above-described photoelectric effect, Compton scattering occurs, and as the energy of the γ-rays is raised, the Compton scattering rays are increased.

According to the present invention, owing to the fact that the respective proportions by weight of lead compound, barium compound and iron compound are selected at 70 to 90 percent, 10 to 20 percent and 3 to 10 percent, respectively, in the principal mixture if the absorber materials are applied onto a mortar wall surface, upon irradiating that mortar with γ-rays, the γ-rays are absorbed a little by the absorber materials according to the present invention and the remainder of the γ-rays penetrate the absorber. The penetrating γ-rays are scattered one or more times within the mortar and then emitted backwardly. The backscattered rays emitted backwardly are absorbed by the lead and converted into characteristic X-rays of 74.95 kev., which characteristic X-rays are absorbed by the barium and converted into characteristic X-rays of 32.19 kev., which are in turn absorbed by the iron and converted into characteristic X-rays of 6.40 kev., whereby the back-scattering is efficiently absorbed.

Figure 2:
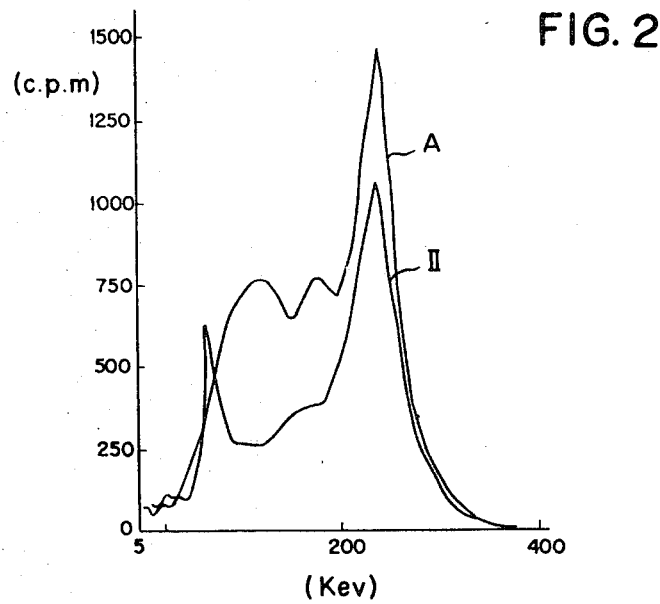
Figure 3:
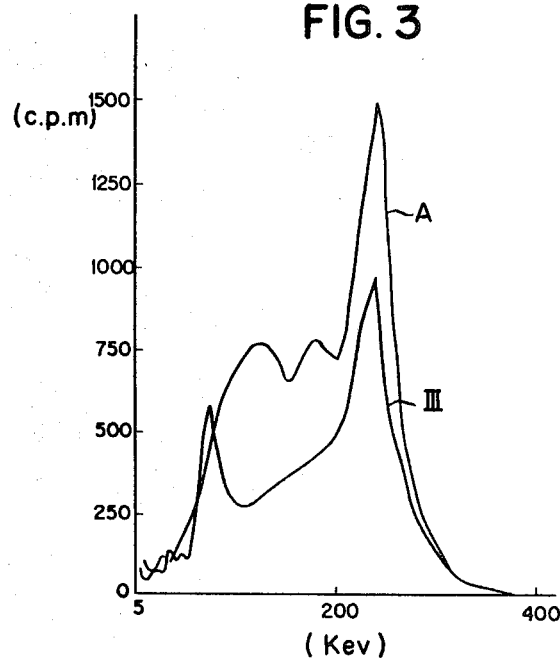
Figure 4:
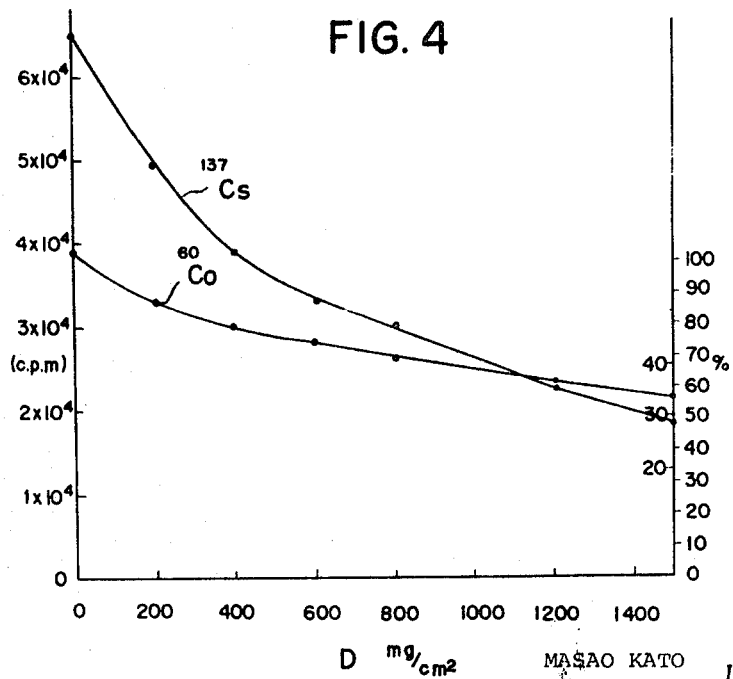
Figure 5:
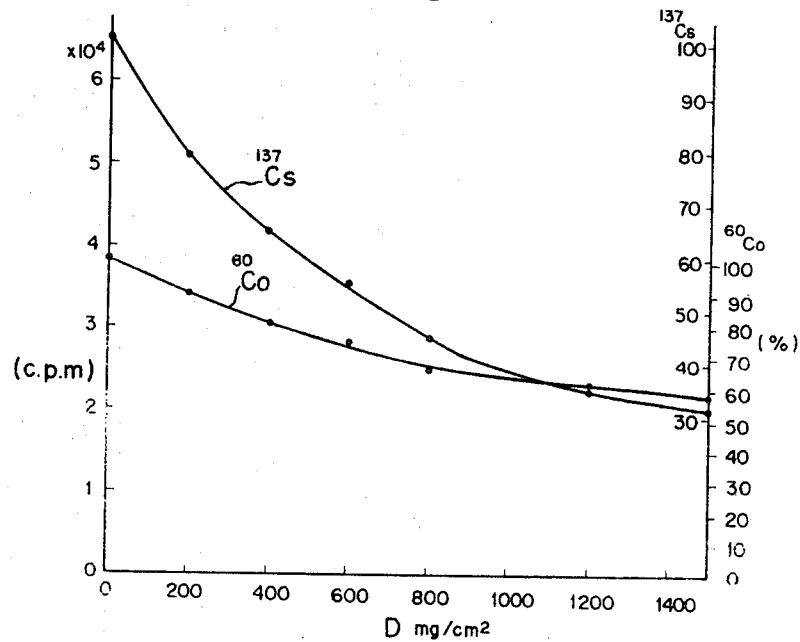
Figure 6:
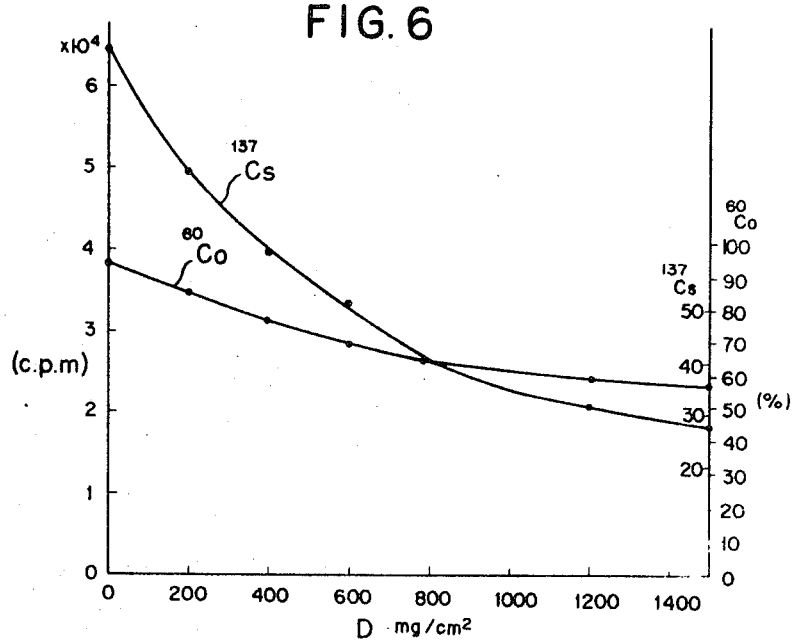

Other features and advantages of the present invention will become more apparent from the following description of the preferred embodiments taken in conjunction with the accompanying drawings, wherein:

FIG. 1 shows energy spectrums of backscattered rays both in the case of mortar only and in the case of mortar applied with the absorber material according to one embodiment of the present invention, FIGS. 2 and 3 respectively show energy spectrums of backscattered rays for other embodiments of the invention, and FIGS. 4, 5 and 6 are diagrams showing the relation between the thickness of the applied layer and the backscattered ray counting rate for said respective embodiments.

Now the present invention will be described with reference to its preferred embodiments.

Example 1:

| | |
|---|---|
| PbO | 80% by weight |
| BaSO$_4$ | 15% by weight |
| Fe$_2$O$_3$ | 5% by weight |

A mixture consisting of the above-listed contents was added with polyvinyl alcohol in 25 percent by weight aqueous solution as vehicle of 28 to 39 percent by weight of mixture, and applied onto a wall surface of mortar (a mixture consisting of 1 part of cement and 3 parts of sand by weight: 2400 mg. per cm.$^2$) at the rate of 1,400 mg. per cm$^2$.

$^{60}$Co γ-rays of 100 mc. was irradiated on the mortar wall surface within an irradiation field of 25πcm.$^2$, and the energy spectrum measured by a 400-channel wave crest analyzer (Type-TMC 401) is shown by curve A in FIG. 1. (The abscissa represents the energy of the scattered X-rays in kev., and the ordinate represents the backscattered ray-counting rate in c.p.m.).

On the other hand, the similar energy spectrum when the absorber material according to one embodiment of the present invention was applied onto the mortar wall surface, is represented by curve I, which obviously indicates that except for the part I-a corresponding to the energy of the characteristic X-rays of lead of 75 kev., the scattered X-rays are absorbed.

Example 2:

| | |
|---|---|
| PbO | 70% by weight |
| BaSO$_4$ | 20% by weight |
| Fe$_2$O$_3$ | 10% by weight |

A mixture consisting of the above-listed contents was added with polyvinyl alcohol in 25 percent by weight aqueous solution as vehicle (28 to 39 percent by weight of said mixture), and applied onto a mortar wall surface at the rate of 1,400 mg./per cm.$^2$. The energy spectrum in this case is shown by curve II in FIG. 2.

Example 3:

| | |
|---|---|
| PbO | 90% by weight |
| BaSO$_4$ | 5% by weight |
| Fe$_2$O$_3$ | 5% by weight |

A mixture consisting of the above-listed contents was added with polyvinyl alcohol in 25 percent by weight aqueous solution as vehicle (28 to 39 percent by weight of said mixture), and applied onto a mortar well surface at the rate of 1,400 mg./per cm$^2$. The energy spectrum in this case is shown by curve III in FIG. 3.

FIGS. 4 to 6 graphically show the relation between the thickness of the specimens D (mg./cm.$^2$) and the backscattered ray-counting rate (c.p.m.) for the respective cases in which the absorber materials having the compositions disclosed in the above-described respective examples were applied onto the mortar wall surface and either $^{60}$Co γ-rays or $^{137}$Cs γ-rays were irradiated thereon, taking the thickness on abscissa and the backscattered ray-counting rate (measured by means of a probe of 2 inches $\phi$ × 2 inches (TMC product) and a counter (TEN. S230 type)) on ordinate.

In the above-described examples, as the vehicle to be added to the principal mixture consisting of lead, iron and barium compounds, polyvinyl alcohol of particular percentage by weight of the principal mixture was used. However, the relatively broad concept of the present invention is limited neither to the particular kind nor the particular percentage by weight of said vehicle. The back-scattering absorption characteristics as illustrated in FIGS. 1 to 6 are determined by the composition of said principal mixture. In other words, so far as the composition of said principal mixture is kept constant, the back-scattering absorption characteristics of the subject back-scattering absorber materials are substantially unaffected by the change of composition and/or proportion of said vehicle.

More particularly, in another type of embodiment, the following composition can be used as vehicle in addition to the same principal mixture as exemplified in Examples 1 to 3 above:

| | |
|---|---|
| Vinyl Acetate (a film forming agent) | 30 parts by weight |
| Methyl Cellulose (a thickening agent) | 0.2 parts by weight |
| (with water) (solvent) | |
| Ammonium Salt of Vinyl Acetate Copolymers in 25% solution ( a dispersing and wetting agent) | 4 parts by weight |

Methyl cellulose above was used as 2 percent aqueous solution, i.e., used together with about 10 parts of water. Fifty percent by weight solution of ammonium salt of vinyl acetate copolymers is commercially available as "Mowilith Ct 5A" as a dispersion paint. "Mowilith Ct 5A" is substantially uncolored highly viscous liquid containing ammonium slat of vinyl acetate copolymers together with carboxyl groups and methanol as a solvent. In the second type of embodiment above, "Mowilith Ct 5A" was diluted by an equal amount of water into 25 percent solution and then mixed together. The vehicle having the above composition (44.2 parts in total) was added to 100 parts of the principal mixture of lead, iron and barium compounds. Therefore, in this case the percentage by weight of the vehicle composition with respect to the principal mixture, is 44.2 percent. However, the proportion of vehicle having such a composition is not limited to this particular percentage. According to the invention, the vehicle of the same composition can be used within the scope of 25 to 67 percent by weight of the principal mixture without substantially affecting the back-scattering absorption characteristics as illustrated in FIGS. 1 to 6, respectively. The vehicles having different compositions can be used in a similar manner. The most favorable proportion of the vehicle is determined experimentally for each of the compositions.

When the second type of vehicle composition is used, which contains a film-forming agent, a thickening agent and a dispersing and wetting agent, said vehicle serves to improve the adhesive property, rigidity, durability and easiness in application onto a mortar wall of the back-scattering absorber materials without substantially deteriorating the back-scattering absorption characteristics for $\gamma$-rays.

While the present invention has been described above with reference to its preferred embodiments, the invention should not be limited to only these embodiments and various changes and modifications in design thereof could be made within the scope of the invention without departing from its spirit.

What is claimed is:

1. Back-scattering absorber material for $\gamma$-rays comprising (a) a principal mixture consisting of 70 to 90 percent by weight of lead compound, 10 to 20 percent by weight of barium compound and 3 to 10 percent of iron compound, and (b) a vehicle therefor.

2. Back-scattering absorber material for $\gamma$-rays, according to claim 1, said principal mixture consisting essentially of 80 percent by weight of PbO, 15 percent by weight of $BaSO_4$ and 5 percent by weight of $Fe_2O_3$.

3. Back-scattering absorber material for $\gamma$-rays, according to claim 1, said principal mixture consisting essentially of 70 percent by weight of PbO, 20 percent by weight of $BaSO_4$ and 10 percent by weight of $Fe_2O_3$.

4. Back-scattering absorber material for $\gamma$-rays, according to claim 1, said principal mixture consisting essentially of 90 percent by weight of PbO, 5 percent by weight of $BaSO_4$ and 5 percent by weight of $Fe_2O_3$.

5. A back-scattering absorber material consisting essentially of 70 to 90 percent by weight of lead compound, 10 to 20 percent by weight of barium compound and 3 to 10 percent by weight of iron compound.

* * * * *